Nov. 4, 1969     J. T. DUDLEY     3,476,202
CHANGE SPEED MEANS FOR USE WITH TILTING CABS
Filed Jan. 30, 1968     2 Sheets-Sheet 1
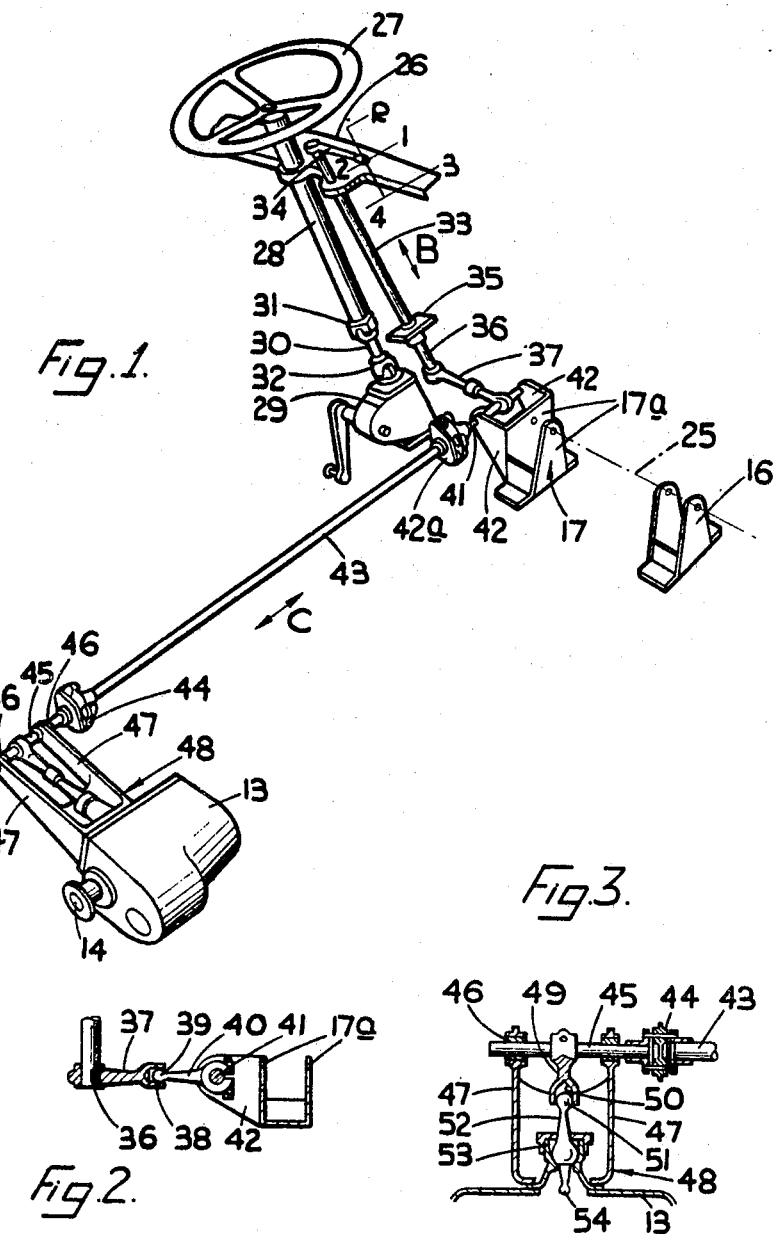
INVENTOR:
JOHN TREVOR DUDLEY
BY Kurt Kelman
AGENT Nov. 4, 1969  J. T. DUDLEY  3,476,202
CHANGE SPEED MEANS FOR USE WITH TILTING CABS
Filed Jan. 30, 1968  2 Sheets-Sheet 2

INVENTOR:
JOHN TREVOR DUDLEY
By Kurt Kelman
AGENT

United States Patent Office 3,476,202
Patented Nov. 4, 1969

3,476,202
CHANGE SPEED MEANS FOR USE WITH TILTING CABS
John Trevor Dudley, Brewood, England, assignor to Joseph Sanky & Sons Limited, Bilston, England, a British company
Filed Jan. 30, 1968, Ser. No. 701,748
Claims priority, application Great Britain, Feb. 3, 1967, 5,224/67
Int. Cl. B60k 27/00, 35/00; G05g 11/00
U.S. Cl. 180—77                              5 Claims

ABSTRACT OF THE DISCLOSURE

There is disclosed a gear change mechanism for a tilting cab vehicle in which a gear control to tilt with the cab comprises a column mounted for locking and reciprocation and connected to a first rockable and reciprocable shaft on the chassis by a universal joint which can be aligned with the tilt axis of the cab, the first shaft being connected by an articulated link to a second rockable and reciprocable shaft on the gear box.

BACKGROUND OF THE INVENTION

Field of the invention

The invention relates to tilting cab vehicles in which the engine is mounted within, or under, or partly within and partly under the cab.

Description of the prior art

There have been various proposals in which a gear change lever has been mounted on the cab to tilt therewith and linkage has been provided between the lever and the gear box to permit the cab to tilt without disconnecting the lever from the gear box. Such proposals, however, have involved quite complicated linkage and it is an object of the present invention to provide a vehicle having a gear change control which can have a lever mounted on a tilting cab to tilt therewith but in which simple linkage is provided between the lever and the gear box.

SUMMARY OF THE INVENTION

According to the invention I provide a gear change mechanism for a vehicle including a chassis, a gear box mounted on the chassis and containing gear selectors and a cab mounted on the chassis for tilting movement relative thereto about a tilt axis; said gear change mechanism comprising a gear change control mounted on the cab to tilt therewith and comprising, a column secured to the cab to tilt therewith and mounted for reciprocation parallel to, and rocking movement about, its longitudinal axis, a gear change lever fixed to one end of the column and a first arm fixed to the other end of the column; a first shaft secured to the chassis and mounted for reciprocation parallel to, and rocking movement about, its longtudinal axis; a second arm fixed to the first shaft to extend radially thereof; a universal joint interconnecting the arms; a second shaft on the gear box and mounted for reciprocation parallel to and rocking movement about its longitudinal axis; an articulated link connecting the first and second shafts so that the shafts execute similar movements; and operating means connected to the second shaft to engage said gear selectors; the column having a predetermined position in which the universal joint is so located that the arms can pivot relative to one another at said joint about an axis substantially coincident with said tilt axis.

When using the invention, if it is desired to tilt the cab to gain access to, say, the engine, the column will be moved into its predetermined position and the cab can then be tilted without disturbing the setting of the gear box since the first and second arms will be able to move relative to each other about the pivotal axis of the cab at the universal joint.

Normally, the predetermined position of the column in which the cab may be tilted will be that in which the gear box is in neutral.

The invention will now be described in detail by way of example with reference to the accompanying drawings in which:

FIGURE 1 is a perspective view of a gear change control embodying the invention;

FIGURE 2 is a sectional view through the universal joint between the first and second arms of the control FIGURE 1;

FIGURE 3 is a sectional view showing the connection of the second shaft to the gear box.

Figure 4:
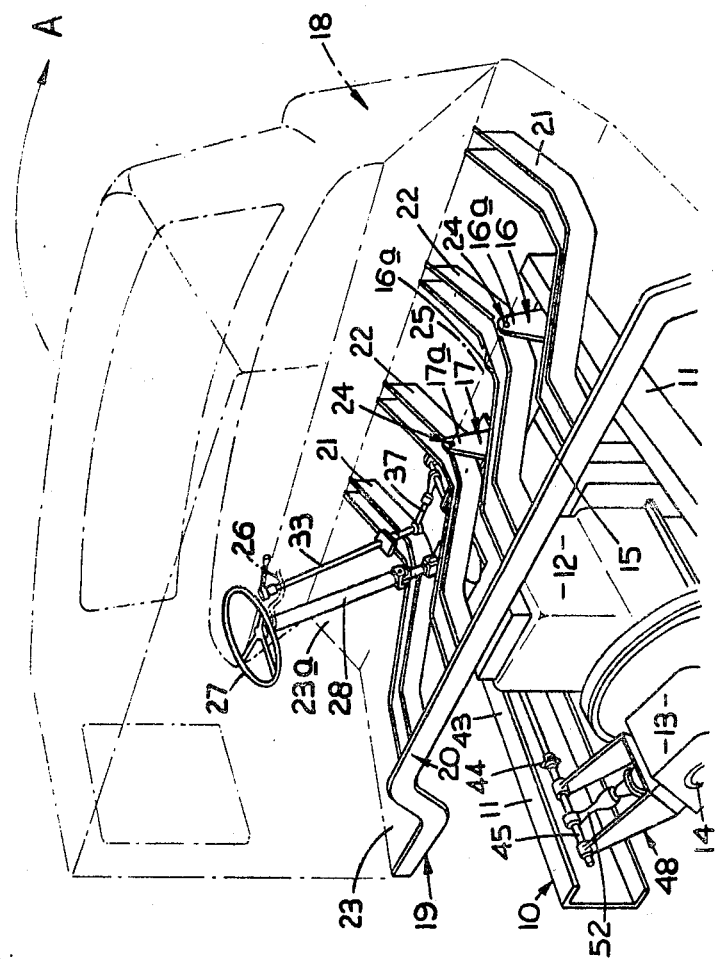
FIGURE 4 is a perspective view of the control installed in a motor vehicle showing part of the chassis and the cab.

Referring now to FIGURE 4 the vehicle comprises a chassis 10 having side members 11 between which are mounted an engine 12 and gearbox 13, the latter having an output shaft 14 for connection to a propeller shaft, not shown. The chassis has a front cross member 15 on which is mounted two spaced brackets 16 and 17. A cab shown in chain dotted lines at 18 comprises a cross member 19 which is shaped at 20 to clear the engine 12 and four members 21 and 22 of top-hat section which project forwardly of the cross member 20 and support the cab floor 23 and toe board 23a.

The members 21 lie outside the chassis but the members 22 are received between the limbs 16a and 17a of the brackets 16 and 17 and are connected thereto by pivital connections indicated generally at 24. The cab is tiltable from its normal position shown about the tilt axis 25, which is determined by the pivotal connections 24, and in the direction of the arrow A to give access to the engine 12 and other running gear, not shown.

A bracket 26 forms part of the cab and supports the steering wheel of the vehicle which is indicated at 27 and the steering column 28. The steering arrangement is such as to permit tilting of the cab and the lower end of the steering post within the column 28 is connected to the steering box 29 by means of an extensible shaft 30 having universal joints 31 and 32 at its ends.

The gear change control comprises a column 33 having a gear change lever 34 at the top thereof, the column being journalled for rocking about, and reciprocation parallel to, its longitudinal axis in the bracket 26 and in a flanged sleeve 35 mounted on the toe board 23a.

The lower end 36 of the column 33 is fixedly connected to a first arm 37 having a socket 38 shown in FIGURE 2. The socket 38 receives a ball 39 at the end of a second arm 40 which is fixed to a longitudinally extending first shaft 41 which is mounted in two lugs 42 forming part of the bracket 17 for rocking about, and reciprocation parallel to, its longitudinal axis. The shaft 41 is connected through a universal joint 42a to a link 43 which in turn is connected through a universal joint 44 to a second shaft 45 mounted in bearings 46 in arms 47 forming part of a bracket 48 secured to the gear box 13. The shaft 45 is mounted so that it may rock about, and reciprocate parallel to, its longitudinal axis. The shaft 45 carries a third arm 49 having a socket 50 which engages a ball 51 at the outer end of a lever 52. The lever 52 is universally held in a ball mounting 53 on the gear box 13 and provides an end 54 for engagement with selectors in the gear box.

It will be seen that the bracket 48 is canted over to the left in FIGURES 1 and 4, the arrangement shown being a left-hand drive, and the link 43 passes to the left of the engine 12 and clear thereof. The universal joints 42a and 44 allow for vibration and relative movement of the gear box and the chassis when the vehicle is in use.

The gear change lever 34 can be moved into any one of the five positions 1, 2, 3, 4 and R shown in FIGURE 1 which constitute the positions for a gear box having four forward speeds and a reverse. It will be seen that the lever can be placed in any one of the positions by rocking or by a combination of rocking and axially sliding the column 33 in its bearings. It will be seen that if the column 33 is slid in one of the directions indicated by the double-headed arrow B the shafts 41 and 45 will rotate. If, however, the column 33 is rocked, the shafts 41 and 45 will move in a direction indicated by the double-headed arrow C depending on the direction of rocking of the column 33. It will be seen that the link 43 connects the shafts 45 so that they execute similar movements.

Appropriate operation of the lever 34 can thus rock and reciprocate the shaft 45 and thus move the lever 52 to operate the gear selectors in a conventional manner.

The arrangement is such that, when the lever 34 is in its neutral position as shown in FIGURE 1, the universal joint constituted by the socket 38 and ball 39 is aligned with the axis 25 about which the cab tilts. The cab can thus pivot about this axis taking with it the column 33 and the arm 37 and will merely cause pivoting between the ball 39 and the socket 38 without causing any disturbances in the remainder of the linkage so that the cab may be tilted without disturbing the setting of the gear box.

If desired, some other position of the column 33 could be selected in which the universal joint 38, 39 is aligned with the tilt axis 25 of the cab but neutral is the preferred position.

It will be seen that the invention provides a simple arrangement whereby a gear change control can be provided in a tilting cab vehicle with the control fixed to tilt with the cab.

I claim:

1. A gear change mechanism for a vehicle including a chassis, a gear box mounted on the chassis and containing gear selectors and a cab mounted on the chassis for tilting movement relative thereto about a tilt axis; said gear change mechanism comprising a gear change control mounted on the cab to tilt therewith and comprising a column secured to the cab to tilt therewith and mounted for reciprocation parallel to, and rocking movement about, its longitudinal axis, a gear change lever fixed to one end of the column and a first arm rigidly fixed to the other end of the column and extending radially therefrom; a first shaft secured to the chassis and mounted for reciprocation parallel to, and rocking movement about, its longitudinal axis; a second arm rigidly fixed to the first shaft to extend radially thereof; a universal joint interconnecting the adjacent ends of said arms; a second shaft on the gear box and mounted for reciprocation parallel to and rocking movement about its longitudinal axis; an articulated link connecting the first and second shafts so that the shafts execute similar movements; and operating means connected to the second shaft to engage said gear selectors; the column having a predetermined position in which the universal joint is so located that the arms can pivot relative to one another at said joint about an axis substantially coincident with said tilt axis.

2. Gear change mechanism according to claim 1 wherein said predetermined position of the column is that in which the gear box is in neutral.

3. Gear change mechanism according to claim 1 wherein the universal joint is a ball and socket joint.

4. Gear change mechanism according to claim 1 wherein the operating means comprises a third arm fixed to the second shaft and having a ball and socket connection with a lever universally mounted on the gear box and engaging said selectors.

5. Gear change mechanism according to claim 1 wherein the first shaft is mounted on a bracket secured to the chassis and which also pivotally supports the cab.

References Cited

UNITED STATES PATENTS

| | | | |
|---|---|---|---|
| 2,854,088 | 9/1958 | Dence | 180—77 |
| 3,329,229 | 7/1967 | Mukho | 180—77 |
| 3,392,597 | 7/1968 | Herrmann | 180—77 |

A. HARRY LEVY, Primary Examiner

U.S. Cl. X.R.

74—473, 484; 180—89